United States Patent Office 3,156,681
Patented Nov. 10, 1964

3,156,681
POLYMERIZATION PROCESS
Sheldon Kavesh, Leominster, Mass., and Arnold J. Rosenthal, Whippany, and George Walter Halek, New Providence, N.J., assignors to Celanese Corporation of America, New York, N.Y., a corporation of Delaware
No Drawing. Filed Aug. 15, 1960, Ser. No. 49,437
6 Claims. (Cl. 260—93.7)

This invention relates to an improved process for the polymerization of ethylenically unsaturated compounds.

In recent years various catalyst systems have been proposed for the polymerization of ethylenically unsaturated compounds which results in polymers having a greater degree of stereo-specificity, i.e., a greater degree of three dimensional order than polymers made previously with conventional free radical yielding catalysts. However, many of the polymers obtained with these new catalysts are not completely satisfactory due, for example, to the fact that they do not possess the desired degree of molecular weight and/or crystallinity, or a particularly desired combination of molecular weight and crystallinity. With other of these newer catalysts, the polymer yield may be too low for a commercially attractive process.

It is an object of this invention to provide an improved process for the polymerization of ethylenically unsaturated compounds. It is a further object of this invention to provide a new catalyst system for the polymerization of ethylenically unsaturated compounds whereby polymers of a high degree of molecular weight and crystallinity may be obtained. It is a still further object of this invention to provide a new catalyst system for the polymerization of ethylenically unsaturated compounds whereby an improved yield of polymer is obtained. Other objects will be apparent from the following detailed description and claims.

In accordance with one aspect of the invention an ethylenically unsaturated compound is polymerized in the presence of a catalyst system comprising three essential components:

(1) As an oxidizing component, a compound of one or more elements from Groups IVa, Va, VIa, VIIa, and VIII of the Periodic Table (Mendeléef) wherein said element has a valence above its most reduced state;

(2) As a reducing component, at least one compound of one or more elements from Groups Ia, IIa, and b, and IIIa and b, of the Periodic Table;

(3) An unsaturated ether.

Particularly good results are obtained if the catalyst contains as an additional component a Lewis base, i.e., a compound which acts as an electron donor under the conditions of reaction.

The oxidizing component of the catalyst may be, for example a compound of a Group IVa, Va, VIa, VIIa, or VIII transition heavy metal wherein the valence of said metal is above that of its most reduced state, and is attached for example to a halide, oxyhydrocarbon, e.g. alkoxide, or oxide group. Some specific compounds are titanium tri- and tetrachloride, titanium tri- and tetrabromide, zirconium tetrachloride, zirconium tetrabromide, chromyl chloride, chromyl acetate and vanadium trichloride. However the most preferred oxidizing component is a specific compound which may be produced by reacting aluminum metal with titanium tetrachloride in the presence of an organic solvent and if desired aluminum chloride as a catalyst, at a temperature of 80 to 220° C. The compound appears to have a homogeneous crystalline structure and contains various amounts of organic matter. It has the unique and characteristic X-ray diffraction pattern as defined below, and will be referred hereinafter as the "titanium composition."

Some suitable compounds which may act as the reducing component of the catalyst are for example compounds in which a Group Ia, IIa or b, or IIIa or b element is attached directly to a carbon atom or hydrogen. Some specific compounds within the class are metal alkyls and aryls wherein each organic group contains for example one to six carbon atoms, e.g., aluminum trimethyl, aluminum triethyl, aluminum triisobutyl, cadmium diethyl, cadmium diphenyl, sodium isoamyl, lithium n-butyl and Grignard reagents such as methyl magnesium iodide, ethyl magnesium bromide, propyl magnesium chloride, butyl magnesium bromide, isopropyl magnesium chloride, cyclohexyl magnesium chloride and phenyl magnesium bromide. The preferred compounds are the aluminum trialkyls.

Suitable unsaturated ethers are vinyl ethers, e.g., vinyl alkyl ethers wherein the alkyl group contains one to four carbon atoms such as vinyl methyl ether, vinyl ethyl ether, vinyl n-propyl ether, vinyl isopropyl ether, vinyl n-butyl ether, and vinyl isobutyl ether. The preferred compound is vinyl isobutyl ether.

As the optional fourth component of the catalyst, some suitable Lewis bases are for example aliphatic and aromatic ethers which are devoid of non-benzenoid unsaturation especially the di-lower alkyl ethers such as diethyl ether, aliphatic and aromatic amines especially the tri-lower alkyl amines such as triethyl amine, and phosphines such as triphenyl phosphine.

It has been found that with the polymerization catalyst system of this invention, it is possible to obtain improved yields of polymers having a reproducibly high degree of crystallinity. Moreover, when a Lewis base is used, it is possible by changing the ratio of reducing components, e.g. aluminum trialkyl, to Lewis base, to regulate the degree of crystallinity of the polymer.

The anhydrous titanium composition of this invention is essentially a trivalent titanium composition in which the titanium and aluminum values are combined with chlorine. In general the composition is prepared by admixing titanium tetrachloride and aluminum metal with an organic solvent which dissolves but does not react with titanium tetrachloride and heating the mixture to cause a reaction at a temperature in the range of 80 to 220° C. Preferably the reactant added last, whether aluminum or titanium tetrachloride, is added gradually to prevent the reaction from being too rapid. The reaction mass is usually heated under total reflux to maintain the temperature of reaction for a time sufficient to cause the reaction to be substantially complete. In many cases the quantities of the reagent used are substantially the theoretical amounts required to reduce the tetravalent titanium values to the trivalent state, i.e. three mols of titanium tetrachloride to 1 mol of aluminum, these proportions being hereinafter identified as stoichiometric amounts. However, the composition may be prepared with an excess of the stoichiometric amount of either the aluminum metal or the titanium since the excess remains unreacted.

The organic solvent is used in an amount effective in dispersing the reactants sufficiently; in many cases this amounts is in the range of 0.5 to 3 liters per gram milliequivalent of titanium in the titanium composition, an equivalent weight of titanium being defined as equal to a gram atom of titanium. On cooling the mixture particles of titanium composition of very small size e.g. less than 5 microns and having a homogeneous crystalline structure are formed and may be filtered or used as a slurry in part of the solvent in the preparation of the catalyst system of this invention. The compound dissolves readily in water and remains dissolved. It also disperses readily in hydrocarbons.

The organic solvent used in the preparation of the titanium composition, which should be distinguished from any solvent used in a subsequent polymerization, preferably boils within the reaction temperature range of 80 to 220° C., although higher boiling solvents may be used. Some of the solvents contemplated are aliphatic and aromatic hydrocarbons, e.g. kerosene, mineral spirits, paraffin oil, mineral oil, xylene, toluene, benzene, naphthalene and tetralin as well as halogenated hydrocarbons such as chlorobenzene and the like.

When the titanium composition is prepared by reacting aluminum metal with titanium tetrachloride in the presence of an organic solvent the crystals produced contain varying amounts of the organic solvent associated therewith. The amount of associated organic solvent varies considerably and is dependent upon the operational conditions employed. Should it be desirable to remove some or even a major portion of the solvent any standard extraction process may be employed. Up to $9/10$ of the organic solvent can be readily removed by simple extraction methods using various agents, e.g., toluene, petroleum ether, carbon disulfide and the like. Compositions containing as little as 3–4% organic solvent have been prepared in this manner.

In carrying out the polymerization process, the components of the catalyst are contacted with monomer under agitation in a reactor either in the presence of an organic solvent for the polymerization which may or may not be the same solvent as that used in the preparation of the titanium composition, or without the addition of any solvent. It has been found that pentane is particularly suitable as a reaction solvent although any organic solvent which dissolves but does not react with the titanium composition and the organometallic compound may be used. In general, substances such as oxygen and water which may unfavorably interfere with the polymerization are rigidly excluded from the system, e.g., through the use of a nitrogen blanket in the vapor space. However, in some cases hydrogen may be present in the system as a control on the inherent viscosity of the polymer obtained.

After the reaction has proceeded to the desired point it is interrupted and the polymer precipitated by adding to the mass a nonsolvent for the polymer, e.g. methanol. The polymer is then separated and washed. The process may be carried out batchwise wherein the monomer is added to a mass of catalyst in an autoclave until the desired amount of polymer is produced after which the reaction is interrupted and the polymer precipitated, or the process may be carried out continuously, e.g. by sending streams of catalyst, solvent and monomer into the bottom of the reactor and continuously withdrawing the mass comprising polymer, catalyst, unreacted monomer and solvent from the top of the reactor.

The optimum reaction conditions will depend to some extent on the type of monomer and the proportions of reactants and catalyst. One suitable range of catalyst concentration is 0.001 to 0.1 gram equivalent of titanium in the titanium composition or other transition heavy metal per liter of reaction space with the ratio of gram equivalents of titanium in the titanium composition or other transition heavy metal to mols of reducing component, e.g., organo metallic compound in the catalyst being from 60:1 to 1:30, preferably 3:1 to 1:10, and a suitable range of ratios of gram equivalents of titanium in the titanium composition or other transition heavy metal to mols of Lewis base being from 0.1 to 10, preferably 1 to 5. The unsaturated ether may be used, for example, in the range of 0.0005 to 0.5, preferably 0.001 to 0.1 millimol per gram milliequivalent of titanium in the titanium composition, or other transition heavy metal in the catalyst. In the case of titanium in the titanium composition, a gram milliequivalent is equal to a milligram atom or millimol. Depending upon the monomer being polymerized and the conditions of polymerization as much as 200 grams of polymer or more can be produced per gram of titanium composition. Suitably the temperature of polymerization is in the range of 0 to 200° C. preferably 50° to 120° C. and the pressure in the range of 0 to 400 p.s.i.g. preferably 50 to 150 p.s.i.g.

The process of this invention is particularly useful for polymerizing ethylenically unsaturated hydrocarbons, especially those in which the unsaturation is in the alpha position. Some of the alpha olefins which may be polymerized are ethylene, propylene, butene-1, 3-methyl butene-1 and 4-methyl pentene-1, and mixtures thereof to form copolymers. A preferred group of alpha-olefins are those containing three to ten carbon atoms.

The following examples further illustrate the invention. The first two examples illustrate the preparation and properties of the titanium composition contemplated. The subsequent examples are of polymerization processes under the invention.

Example I

One mol of pigmentary grade flake aluminum metal was added to three liters of kerosene. Three mols of titanium tetrachloride were added to the mixture which was previously heated to 200° C. The titanium tetrachloride was added dropwise over a one hour period. After four hours of heating, the mass was allowed to cool. A large amount of black, homogeneous crystals of the titanium composition was obtained. The entire mass was filtered and the filtration rate was exceedingly rapid. The crystals, containing kerosene, were then washed in toluene and dried under a inert atmosphere and stored in a closed container to prevent oxidation.

The yield of crystals obtained was substantially 100% of the theoretical amount calculated, and substantially all of the aluminum metal was reacted. The crystals also contained solvent in amount of 40% by weight.

These crystals were readily soluble in water and produced a yellowish colored solution.

These crystals were identified as being a titanium composition in which the titanium values were essentially trivalent and had the following characteristic X-ray diffraction pattern:

| d | $I/I_1$ | d | $I/I_1$ |
|---|---|---|---|
| 5.91 | Very strong. | 2.72 | Weak-medium. |
| 5.32 | Medium. | 2.52 | Strong. |
| 5.10 | Do. | 2.13 | Weak. |
| 4.55 | Weak-medium. | 1.96 | Weak-medium. |
| 3.95 | Weak. | 1.80 | Medium. |
| 3.03 | Medium. | 1.77 | Medium-strong. |
| 2.94 | Weak-medium. | 1.70 | Weak-medium. |
| 2.90 | Do. | 1.47 | Do. | d = interplanar spacings expressed in angstrom units.
$I/I_1$ = relative intensities.

Example II

The procedure of Example I was repeated except that mineral spirits was used in place of kerosene. The reaction was carried out at 160° C. for three hours. Again a substantially 100% yield of black homogeneous crystals was obtained. The crystals had 33% by weight mineral spirits associated with the titanium composition.

In order to remove most of the mineral spirits associated with the crystals, the crystals were placed in a Soxhlet extractor with carbon disulfide and the extraction was run for 18 hours. The extracted crystals were then removed from the extractor. The crystals analyzed as follows:

|  | Percent by weight |
|---|---|
| Ti | 23.4 |
| Al | 4.6 |
| Cl | 64.4 |
| Org. | 7.6 |

These crystals had the same X-ray diffraction pattern as that previously described except that the pattern was more distinct.

The same titanium composition was prepared using various other solvents including mineral oils, paraffin oils, xylene, toluene, benzene, Stoddard's solvent, chlorobenzene and the like by the same methods as that described in the above examples.

The remaining examples are drawn to the polymerization of propylene. In all the examples routine measures were taken for the rigid exclusion of oxygen and water from both the apparatus and materials used. The reactants were handled under a protective nitrogen blanket. The titanium composition as a slurry in mineral spirits or xylene or as a dry powder and washed free of titanium tetrachloride was mixed with pentane and added to the reactor. In a separate container, aluminum trimethyl as a solution in heptane with about a 2 molar concentration, diethyl ether and vinyl isobutyl ether were mixed with pentane and the resulting mixture added subsequently to the reactor. The reactor was then sealed and the catalyst mass contacted with the propylene under various conditions after which the reaction was interrupted by cooling and adding methanol. The polymer was worked up by precipitating with an additional amount of methanol, filtering, heating with methanol containing 10% concentrated hydrochloric acid and washing with methanol followed by drying in vacuo at 55° C. The methanol serves to destroy the catalyst by reacting with aluminum and titanium, and the hydrochloric acid serves to extract the metals into an aqueous phase. The inherent viscosity of the polymers was determined from a solution in decahydronapthhalene at 135° C. at a concentration of 0.1 gram/100 ml. solvent. Crystallinity was determined by contacting the polymer successively with boiling diethyl ether and boiling n-heptane at atmospheric pressure for 24 hours and determining the percent by weight of polymer remaining undissolved. The crystalline melting point and flow point of the polymers were determined on a Bausch and Lomb Model LM Dynoptic Polarizing Microscope with attached Kofler Micro Hot Stage.

*Example III*

In this example the catalyst consisted of 15 millimoles of titanium as titanium composition, 20 millimoles of trimethyl aluminum, 50 millimoles of diethyl ether and 1.5 millimoles of isobutyl vinyl ether per liter of pentane as solvent in the reaction zone. The temperature of reaction was 70° C. and the pressure was 110 p.s.i.g. The polymer was obtained in a yield of 203 grams per hour per liter of pentane and had a crystallinity based on heptane insolubility of 84%, an inherent viscosity of 4.2, and a density of 0.900 gram per cubic centimeter.

When the polymerization was carried out under the same conditions as above except that no isobutyl vinyl ether was used, the yield of polymer obtained was only 15 grams per hour per liter of pentane.

*Example IV*

The reaction was carried out under the same conditions as Example III except that the amount of isobutyl vinyl ether used was 0.015 rather than 1.5 millimoles per liter of pentane. The polymer was obtained in a yield of 370 grams per hour per liter of pentane and it had a crystallinity based on heptane insolubility of 84 percent, an inherent viscosity of 3.7, and a density of 0.899.

*Example V*

In this example the catalyst consisted of 10 millimoles of titanium as titanium composition, 10 millimoles of aluminum trimethyl, 75 millimoles of diethyl ether, and 1.5 millimoles of isobutyl vinyl ether per liter of pentane. The reaction was carried out at a temperature of 50° C. and a pressure of 150 p.s.i.g. The polymer was obtained in a yield of 26 grams per hour per liter of pentane and it had an inherent viscosity of 9.1 and a density of 0.901 gram per cubic centimeter.

The polymers produced by the process of this invention are useful in a wide variety of applications e.g. piping, containers of various types, household articles etc. In addition, the more highly crystalline polymers may be formed into fibers for the manufacture of textiles.

It is to be understood that the foregoing detailed description is given merely by way of illustration and that many variations may be made therein without departing from the spirit of our invention.

Having described our invention what we desire to secure by Letters Patent is:

1. A polymerization catalyst system comprising (1) an anhydrous crystalline titanium composition of aluminum, titanium, and chlorine, said titanium being essentially trivalent, said composition having the following X-ray diffraction pattern:

| d | $I/I_1$ | d | $I/I_1$ |
|---|---|---|---|
| 5.91 | Very strong. | 2.72 | Weak-medium. |
| 5.32 | Medium. | 2.52 | Strong. |
| 5.10 | Do. | 2.13 | Weak. |
| 4.55 | Weak-medium. | 1.96 | Weak-medium. |
| 3.95 | Weak. | 1.80 | Medium. |
| 3.03 | Medium. | 1.77 | Medium-strong. |
| 2.94 | Weak-medium. | 1.70 | Weak-medium. |
| 2.90 | Do. | 1.47 | Do. | d = interplanar spacings expressed in angstrom units.
$I/I_1$ = relative intensities.

(2) at least one aluminum alkyl, (3) an aliphatic ether free of non-benzenoid unsaturation, and (4) a vinyl alkyl ether; the ratio of gram equivalents of titanium in said composition to mols of said aluminum alkyl being from 60:1 to 1:30; the ratio of gram equivalents of titanium in said composition to mols of aliphatic ether being from 0.1 to 10; and the ratio of millimoles of said vinyl alkyl ether per gram equivalent of titanium in said titanium composition being from 0.0005 to 0.5.

2. The polymerization catalyst system of claim 1 wherein said aliphatic ether is a dialkyl ether.

3. The polymerization catalyst system of claim 1 wherein said aluminum alkyl is an aluminum trialkyl.

4. A polymerization catalyst system comprising (1) an anhydrous crystalline titanium composition of aluminum, titanium, and chlorine, said titanium being essentially trivalent, said composition having the following X-ray diffraction pattern:

| d | $I/I_1$ | d | $I/I_1$ |
|---|---|---|---|
| 5.91 | Very strong. | 2.72 | Weak-medium |
| 5.32 | Medium. | 2.52 | Strong. |
| 5.10 | Do. | 2.13 | Weak. |
| 4.55 | Weak-medium. | 1.96 | Weak-medium. |
| 3.95 | Weak. | 1.80 | Medium. |
| 3.03 | Medium. | 1.77 | Medium-strong. |
| 2.94 | Weak-medium. | 1.70 | Weak-medium. |
| 2.90 | Do. | 1.47 | Do. | d = interplanar spacings expressed in angstrom units.
$I/I_1$ = relative intensities.

(2) an aluminum trialkyl, (3) a dialkyl ether, and (4) a vinyl alkyl ether; the ratio of gram equivalents of titanium in said composition to mols of said aluminum trialkyl being from 60:1 to 1:30; the ratio of gram equivalents of titanium in said composition to mols of dialkyl ether being from 0.1 to 10; and the ratio of millimoles of said vinyl alkyl ether per gram equivalent of titanium in said titanium composition being from 0.0005 to 0.5.

5. A method of polymerizing at least one monoethylenically unsaturated hydrocarbon monomer having from 1 to 10 carbon atoms comprising contacting said monomer with a polymerization catalyst system comprising (1) an anhydrous crystalline titanium composition of aluminum, titanium, and chlorine, said titanium being essentially trivalent, said composition having the following X-ray diffraction pattern:

| d | I/I₁ | d | I/I₁ |
|---|---|---|---|
| 5.91 | Very strong. | 2.72 | Weak-medium. |
| 5.32 | Medium. | 2.52 | Strong. |
| 5.10 | Do. | 2.13 | Weak. |
| 4.55 | Weak-medium. | 1.96 | Weak-medium. |
| 3.95 | Weak. | 1.80 | Medium. |
| 3.03 | Medium. | 1.77 | Medium-strong. |
| 2.94 | Weak-medium. | 1.70 | Weak-medium. |
| 2.90 | Do. | 1.47 | Do. | d = interplanar spacings expressed in angstrom units.
I/I₁ = relative intensities.

(2) at least one aluminum alkyl, (3) an aliphatic ether free of non-benzenoid unsaturation, and (4) a vinyl alkyl ether; the ratio of gram equivalents of titanium in said composition to mols of said aluminum alkyl being from 60:1 to 1:30; the ratio of gram equivalents of titanium in said composition to mols of aliphatic ether being from 0.1 to 10; and the ratio of millimoles of said vinyl alkyl ether per gram equivalent of titanium in said titanium composition being from 0.0005 to 0.5; at a temperature between about 0 to 200° C. and a pressure between about 0 to 400 p.s.i.g., in a solution comprising an organic solvent for said monomer, which solvent disperses but does not react with the components of said catalyst system.

6. The method of claim 5 wherein said aliphatic ether is a dialkyl ether.

References Cited in the file of this patent

UNITED STATES PATENTS 3,010,787 Tornquist _____ Nov. 28, 1961

FOREIGN PATENTS 1,171,450 France _____ Oct. 6, 1958
1,196,060 France _____ May 25, 1959